United States Patent [19]

Nagai

[11] Patent Number: 4,742,725

[45] Date of Patent: May 10, 1988

[54] MECHANISM FOR APPLYING PRE-LOAD TO BEVEL GEAR DEVICE

[75] Inventor: Junichi Nagai, Toyota, Japan

[73] Assignee: Toyota Jidosha Kabushiki Kaisha, Japan

[21] Appl. No.: 891,381

[22] Filed: Jul. 31, 1986

[30] Foreign Application Priority Data

Aug. 2, 1985 [JP] Japan .................. 60-118917[U]

[51] Int. Cl.$^4$ ............................................. F16H 55/18
[52] U.S. Cl. ...................................... 74/409; 74/410; 74/417
[58] Field of Search ............... 74/400, 402, 409, 410, 74/417

[56] References Cited

U.S. PATENT DOCUMENTS

| 2,984,121 | 5/1961 | Folkerts | 74/409 |
| 3,252,348 | 5/1966 | Folkerts | 74/409 |
| 3,333,481 | 8/1967 | Kulig | 74/417 |
| 3,608,644 | 9/1971 | Shimanckas | 74/417 X |
| 4,282,765 | 8/1981 | Ashauer et al. | 74/409 X |
| 4,406,174 | 9/1983 | Szostak | 74/409 |

FOREIGN PATENT DOCUMENTS

| 2213284 | 9/1973 | Fed. Rep. of Germany | 74/417 |
| 787272 | 9/1935 | France | 74/417 |
| 1159505 | 6/1958 | France | 74/409 |
| 491067 | 2/1954 | Italy | 74/417 |
| 58-125760 | 8/1983 | Japan |  |
| 58-160873 | 10/1983 | Japan |  |

Primary Examiner—Leslie A. Braun
Assistant Examiner—Dwight G. Diehl
Attorney, Agent, or Firm—Parkhurst & Oliff

[57] ABSTRACT

In a bevel gear device, wherein bevel gears are provided which are fixed to forward ends of shafts crossing each other, respectively, and in mesh with each other, and a turning force applied to one of the shafts is imparted to the other, at least either one of the shafts is made movable in the axial direction thereof, and a preload is applied to the movable shaft in the advancing direction, in which the bevel gears are in mesh with each other, by use of a first force. As a consequence, fluctuations of the backlash are reliably absorbed, necessity of the backlash adjustment is eliminated, and an excessively high pre-load can be prevented from being generated. Furthermore, another pre-load is applied to the movable shaft in the direction reverse to the first force, by use of a second force weaker than the first force. As a consequence, a tooth surface force applied to the bevel gears can be reduced.

12 Claims, 2 Drawing Sheets

MECHANISM FOR APPLYING PRE-LOAD TO BEVEL GEAR DEVICE

BACKGROUND OF THE INVENTION

1. Field of the Invention

This invention relates to a mechanism for applying a preload to a bevel gear device, and more particularly to improvements in a mechanism for applying a pre-load to bevel gear device suitable for use in a steering system of a cab-over type motor vehicle, wherein bevel gears are provided which are fixed to forward ends of shafts crossing each other, respectively, and in mesh with each other, and a turning force applied to one of the shafts is imparted to the other.

2. Description of the Prior Art

As shown in FIG. 3 for example, in general, the steering system of the cab-over type motor vehicle is comprised of: a steering shaft 12 for supporting a steering wheel 10; a rack and pinion type steering device 14 for steering front wheels, not shown, for example; and a bevel gear device 22 for connecting the steering shaft 12 to the steering device 14 through couplings 16, 18 and 20.

In the bevel gear device 22, bevel gears 28 and 30, which are fixed to shafts 24 and 26 crossing each other, respectively, and in mesh with each other, and a turning force applied to one 24 (hereinafter referred to as an "input shaft") of the shafts is imparted to the other 26 (hereinafter referred to as an "output shaft").

In the bevel gear device 22 used in the steering system of the motor vehicle as described above, in order to set the efficacy and return of the steering wheel suitably, it is necessary to make the pre-load applied to the bevel gears 28 and 30 compatible with the backlash. More specifically, when the backlash is excessively tightened, the pre-load is increased, whereby, as shown in FIG. 4 for example, fluctuations in mesh between the gears by fluctuations C of the backlash cannot be absorbed, so that an excessively large tooth surface force occurs. On the other hand, when the backlash is excessively high, a play in the steering system becomes excessively large, thus presenting such problems that the steering wheel may become unsteady, impact sounds of the tooth surfaces due to an external input such as a road surface, etc. occur.

As a consequence, it is necessary to give a predetermined suitable backlash. However, there is the limit due to the manufacturing accuracy and the assembling accuracy of the gears. Furthermore, it is difficult to strictly adjust the backlash.

On the other hand, as a pre-load adjusting mechanism for applying a suitable pre-load to bevel gears in the steering system of a motor vehicle, as described in Japanese Utility · Model Laid-Open (Kokai) No. 160873/1983, there is provided that a pre-load block is brought into pressing contact through a resilient force with a small gear end face of the bevel gear 28 on the side of the input shaft 24 connected to the steering wheel 10, so that the steering wheel 10 can be prevented from being unsteady.

Furthermore, a mechanism for removing a backlash from bevel gears, as described in Japanese Utility Model Laid-Open (Kokai) No. 125760/1983, there is proposed that at least one of the bevel gears is journalled on the shaft of the bevel gear in a manner to be movable at least in the axial direction, the bevel gear and the shaft are connected by a sheet spring disposed substantially perpendicular to the axial direction of the shaft, whereby this bevel gear is urged against the other bevel gear, so that the backlash can be prevented without impairing the positioning accuracy.

However, the sole object of the pre-load adjusting mechanism proposed in Japanese Utility Model Laid-Open (Kokai) No. 160873/1983 is to make adjustable the pre-load applied to the input shaft 24 on the side of the steering wheel 10, and presents such a problem that the fluctuations in backlash between the bevel gears 28 and 30 cannot be absorbed because both the input shaft 24 and the output shaft 26 are fixed in the axial direction.

On the other hand, in the backlash removing mechanism proposed in Japanese Utility Model Laid-Open (Kokai) No. 125760/1983, the fluctuations of the backlash can be satisfactorily absorbed and the positioning accuracy is high, however, such an arrangement is adopted that the shafts and the bevel gears are connected to each other through a Belleville spring, so that a high turning torque cannot be transmitted, disadvantageously.

Furthermore, in each of the Japanese Utility Model Laid-Open (Kokai) Nos. 160873/1983 and 125760/1983, since the direction of biasing the bevel gears for applying the pre-load or removing the backlash has been single, such a disadvantage has been presented that it is difficult to make the tooth surface force applied to the bevel gears compatible with the positioning accuracy for bearings, etc. for rotatably supporting the bevel gears.

SUMMARY OF THE INVENTION

The present invention has been developed to obviate the above-described disadvantages of the prior art and has as its object the provision of a mechanism for applying a pre-load to a bevel gear device, wherein fluctuations of the backlash caused due to the manufacture and assembling are absorbed so as to eliminate necessity of adjustment of the backlash, an excessively high pre-load is prevented from occurring, and further, the tooth surface force applied to the bevel gears can be easily made compatible with the holding force of bearings, etc. for rotatably supporting the shafts.

To achieve the above-described object, in a mechanism for applying a pre-load to a bevel gear device, wherein bevel gears are provided, which are fixed to forward ends of shafts crossing each other, respectively, and in mesh with each other, and a turning force applied to one of the shafts is imparted to the other, at least either one of the shafts is made movable in the axial direction thereof, and there are provided first pre-load applying means for applying a pre-load to this movable shaft in the advancing direction, in which the bevel gears are in mesh with each other, by use of a first force and second pre-load applying means for applying a pre-load load to this movable shaft in the direction reverse to the above, by use of a second force weaker than the first force.

A specific embodiment of the present invention is of such an arrangement that stopper means adjustable in its position is provided for controlling a value of the axial movement of the aforesaid movable shaft only at the value of fluctuations of the backlash.

Another specific embodiment of the present invention is of such an arrangement that the first pre-load applying means is made to be a compression coil spring for applying a pre-load to the movable shaft in the advancing direction through an angular bearing and a retainer, which are held on the movable shaft, for rotatably supporting the movable shaft.

A further specific embodiment of the present invention is of such an arrangement that the first pre-load applying means is made to a compression coil spring confined between a retainer held by an angular bearing for rotatably supporting the movable shaft and a spring holder held by the movable shaft.

According to the present invention, in the bevel gear device, wherein the bevel gears are provided, which are fixed to the forward ends of the shafts crossing each other, respectively, and in mesh with each other, and the turning force applied to one of the shafts is imparted to the other, at least either one of the shafts is made movable in the axial direction thereof, and the first pre-load is applied to this movable shaft in the advancing direction, in which the bevel gears are in mesh with each other, by use of the first force. As a consequence, fluctuations of the backlash due to rotations between the bevel gears can be reliably absorbed, impact sounds caused by the external factors can be obviated, an excessively high pre-load is prevented from being generated and necessity of adjustment of the backlash is eliminated, so that the manufacture can be highly facilitated. Furthermore, the second force weaker than the first force is applied to the movable shaft in the reverse direction. As a consequence, the tooth surface force applied to the bevel gears can be reduced, so that the tooth surface force can be easily made compatible with the force of holding the bearing for rotatably supporting the movable shaft. Further, the pre-load applied to the tooth surfaces and the pre-load applied to the bearing, etc. can be set to the optimal values independently of each other, whereby the optimal tooth surface pre-load can be applied without impairing the positioning accuracy of the bearing and the like.

When the stopper means adjustable in its position is provided for controlling the value of the axial movement of the movable shaft only to the value of fluctuations of the backlash necessary for the manufacture and assembling, occurrence of noises due to unsatisfactory tooth bearing and lowered tooth strength can be avoided.

When the first pre-load applying means is made to be the compression coil spring for applying the pre-load to the movable shaft in the advancing direction thereof through the angular bearing and the retainer, which are held on the movable shaft, for rotatably supporting the movable shaft, the compression coil spring can be disposed close to the rear end of the movable shaft, so that assembling can be facilitated.

When the first pre-load applying means is made to be the compression coil spring confined between the retainer held by the angular bearing for rotatably supporting the movable shaft and the spring holder held by the movable shaft, the angular bearing as a whole does not move during fluctuations of the backlash, so that the movable shaft can be held stably and rotatably.

BRIEF DESCRIPTION OF THE DRAWINGS

The above object, features and advantages of the present invention, as well as other objects and advantages thereof, will become more apparent from the description of the invention which follows, taken in conjunction with the accompanying drawings, wherein like reference characters designate the same or similar parts and wherein.

DESCRIPTION OF THE PREFERRED EMBODIMENTS

Embodiments of the bevel gear device used in the steering system of a cab-over type motor vehicle, to which the present invention is applied, will hereunder be described in detail with reference to the accompanying drawings.

Figure 1:
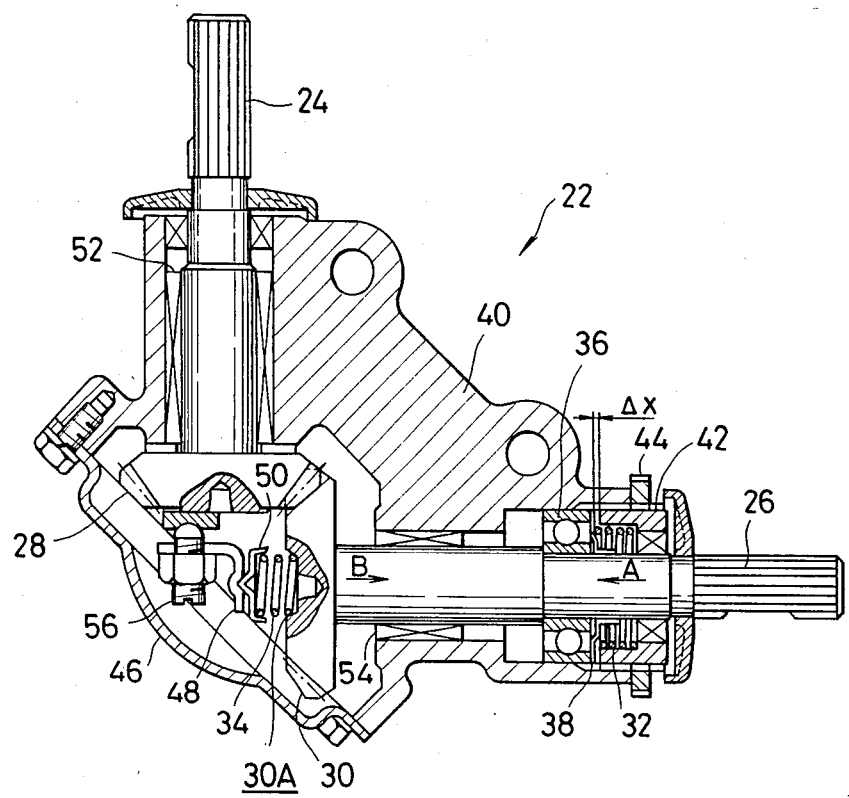
FIG. 1 is a sectional view showing the general arrangement of a first embodiment of the present invention.

As shown in FIG. 1, according to the first embodiment of the present invention, in a bevel gear device 22 of a steering system for a motor vehicle, wherein bevel gears 28 and 30 are provided which are fixed to the forward ends of an input shaft 24 and an output shaft 26, which cross each other perpendicularly, and in mesh with each other, and a turning force applied to the input shaft 24 is imparted to the output shaft 26, the output shaft 26 is made movable in the axial direction thereof, and there are provided a compression coil spring 32 for applying a pre-load to the output shaft 26 in the advancing direction (direction indicted by an arror A), in which the bevel gears 28 and 30 are in meseh with each other, by use of a first force, and a second compression coil spring 34 for applying a pre-load to the output shaft 26 in the reverse direction (direction indicated by arrow B), by use of a second force weaker than the first force.

The first compression coil spring 32 is provided between an angular bearing 36, a retainer 38, which are held by the output shaft 26, for rotatably supporting the output shaft 26 and an adjusting screw 42 threadably coupled to a gear housing 40, and adopted to apply a pre-load to the output shaft 26 in the advancing direction thereof through the angular bearing 36 made movable relative to a gear housing 40 including an outer race in the axial direction thereof and the retainer 38 made movable relative to the output shaft 26.

Figure 4:
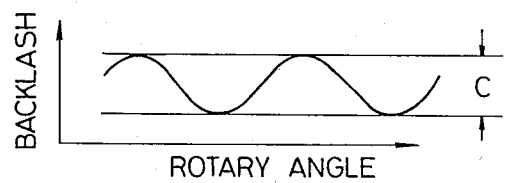
FIG. 4 is a chart showing and example fluctuations of the backlash.

The adjusting screw 42 has a such a function that a variation in its value of retraction controls distance $\Delta x$ between the rear end face of the retainer 38 and the forward end face of the adjusting screw 42, i.e. an axial movement value of the output shaft 26 only to a value C of fluctuations (See FIG. 4) of the backlash necessary for the tooth accuracy and the shaft accuracy to manufacture the bevel gears 28 and 30, and the accuracy of supporting the assembling of the gears. More specifically, when a movable value of the output shaft 26 is excessively high, noises due to unsatisfactory tooth bearing may occur and lowered tooth strength may be resulted, and these disadvantages are prevented. Designated 44 is a lock nut for fixing the position of the adjusting screw 42.

The second compression coil spring 34 is provided between a spring receiver 30A formed on an end face of the bevel gear 30 fixed at the forward end of the output shaft 26 and a spring holder 50 held on a housing cover 46 through a substantially inverted L-shaped retainer 48, and has a function of applying a pre-load to the output shaft 26 in the reverse direction (direction B) by us of a force weaker than the force by the compression coil spring 32. As a consequence, the angular bearing 36 is firmly positioned under a strong force by the first compression coil spring 32, and the tooth surface force between the bevel gears 28 and 30 is reduced to an appropriate value under a weak force by the second compression coil spring 34.

In FIG. 1, designated at 52 and 54 are needle bearings for rotatably supporting the input shaft 24 and the output shaft 26, respectively, and 56 is a pre-load applying adjusting screw for applying a turning frictinal force to the steering wheel, not shown, through the input shaft 24, necessary for preventing the steering wheel from being unsteady.

As described above, the tooth accuracy and the shaft accuracy to manufacture the bevel gears 28 and 30, and the accuracy of supporting and assembling the gears are taken into consideration, a value of fluctuations of the backlash during rotation of the gears is converted into a movement value of the ouput shaft 26, and $\Delta x$ is applied by a value sufficient for arresting noises and maintaining a tooth strength, so that the backlash on the tooth surfaces can be constantly eliminated and an excessively high pre-load can be prevented from occurring.

Additionally, applying of $\Delta x$ can be performed by returning the adjusting screw 42 by a predetermined value, so that necessity of the backlash adjustment in the manufacture can be eliminated, thereby improving the workability.

Since the second compression coil spring 34 is received on an end face of the bevel gear 30, when a high pre-load is applied to the angular bearing 36, pre-loads applied to the tooth surfaces of the bevel gears 28 and 30 can be partially borne by this compression coil spring 34 to reduce the pre-loads, so that the stability of the angular bearing 36 can be made compatible with the reduction of the pre-load.

In this first embodiment, the first compression coil spring 32 is disposed outside the angular bearing 36, so that the assembling thereof can be facilitated.

The second embodiment of the present invention will hereunder be described in detail.

Figure 2:
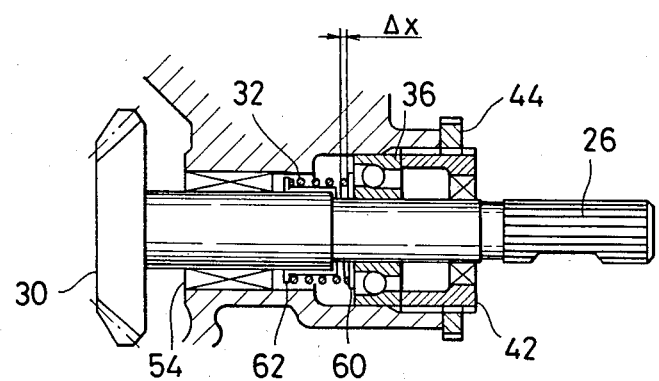
FIG. 2 is a sectional view showing the arrangement of the essential portion of a second embodiment of the present invention.
Figure 3:
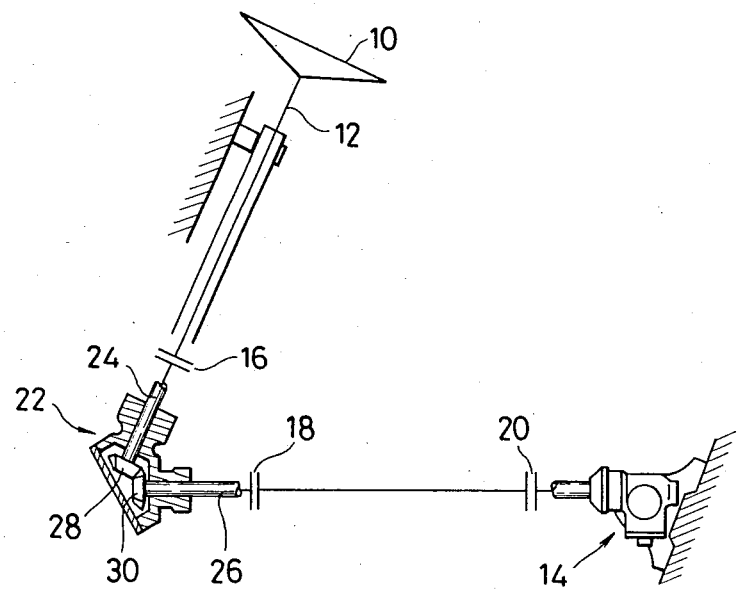
FIG. 3 is a schematic diagram showing the general arrangement of the steering system of a cab-over type motor vehicle.

According to this second embodiment, in the bevel gear device 22 in the steering system of a cab-over type motor vehicle similar to that in the first embodiment, as the essential portions are shown in FIG. 2, the first compression coil spring 32 is provided between a retainer 60 held by the angular bearing 36 having a movable inner race, for rotatably supporting the output shaft 26 and a spring holder 62 held by the output shaft 26, and a pre-load is applied to the output shaft 26 in the advancing direction thereof through the spring holder 62.

In this second embodiment, the aforesaid x is formed between the rear end face of the spring holder 62 and the forward end face of the retainer 60.

The other respects and operations are similar to those in the first embodiment, so that detailed description will be omitted.

In this second embodiment, the output shaft 26 can be moved in the axial direction thereof without moving the angular bearing 36 as a whole, so that the output shaft 26 can be stably held.

In each of the above embodiments, the present invention has been applied to the bevel gear device to be used in the steering system of a cab-over type motor vehicle, however, it is appatent that the scope of application of the present invention need not necessarily be limited to this, and the present invention can be applied to the bevel gear devices commonly used as well. Furthermore, the angle, at which the input shaft and the output shaft cross each other, need not necessarily be limited to 90°.

What is claimed is:

1. A mechanism for applying a pre-load to a bevel gear device, wherein bevel gears are provided which are fixed to forward ends of shafts crossing each other, respectively, and in mesh with each other, and a turning force applied to one of said shafts is imparted to the other, characterized in that:
    at least either one of said shafts is made movable in the axial direction thereof; and
    first spring means for applying a first pre-load to said movable shaft in an advancing direction, in which said bevel gears are in mesh with each other, with a first force to bias said movable shaft in the advancing direction and second spring means for applying a second pre-load to said movable shaft in the direction opposite to said first force with a second force weaker than said first force to reduce a tooth surface force between said bevel gears caused by said first force.

2. A mechanism for applying a pre-load to a bevel gear device as set forth in claim 1, wherein said movable shaft is an output shaft.

3. A mechanism for applying a pre-load to a bevel gear device as set forth in claim 1, wherein stopper means adjustable in its position is further provided for controlling a value of the axial movement of said movable shaft only to the value of fluctuations of the backlash.

4. A mechanism for applying a pre-load to a bevel gear device as set forth in claim 1, wherein said first spring means is a compression coil spring for appling said first pre-load to said movable shaft in the advancing direction through an angular bearing and a retainer, which are held on said movable shaft, for rotatably supporting said movable shaft.

5. A mechanism for applying a pre-load to a bevel gear device as set forth in claim 4, wherein said angular bearing is made movable relative to a gear housing including an outer race in the axial direction thereof and said retainer is made movable relative to said movable shaft.

6. A mechanism for applying a pre-load to a bevel gear device as set forth in claim 1, wherein said second spring means is a compression coil spring provided on the forward end face of the bevel gear.

7. A mechanism for applying a pre-load to a bevel gear device as set forth in claim 1, wherein said first spring means is a compression coil spring confined between a retainer held by an angular bearing for rotatably supporting said movable shaft and a spring holder held by said movable shaft.

8. A mechanism for applying a pre-load to a bevel gear device as set forth in claim 7, wherein an inner race of said angular bearing is made movable.

9. A mechanism for applying a pre-load to a bevel gear device, wherein bevel gears are provided which are fixed to ends of shafts crossing each other, respectively, and in mesh with each other, and in which a turning force applied to one of said shafts is imparted to the other, characterized in that:
    at least one of said shafts is axially movable; and first spring means for applying a first pre-load to said movable shaft in an advancing direction, in which said bevel gears are in mesh with each other, with a first force to bias said movable shaft in the advancing direction and second spring means for applying a second pre-load to said movable shaft in a direction opposite to said first force with a second force weaker than said first force to reduce a tooth surface force between said bevel gears caused by said first force.

10. A mechanism for applying a pre-load to a bevel gear device, comprising:

first and second shafts, one of which is axially movable, wherein bevel gears are fixed to ends of said shafts in mesh with each other in which a turning force applied to one of said shafts is imparted to the other;

first spring means for applying a first force to said movable shaft in an axial direction toward bevel gear of said second shaft; and second spring means for applying a second force to said movable shaft in a direction opposite said first force, said second force being weaker than said first force.

11. A mechanism for applying a pre-load to a bevel gear device comprising:

first and second shafts, one of which is axially movable, wherein bevel gears are fixed to ends of said shafts in mesh with each other in which a turning force applied to one of said shafts is imparted to the other;

first spring means disposed about said movable shaft and spaced from the end of said movable shaft on which the bevel gear is fixed, for applying a first force to said movable shaft in an axial direction toward said bevel gear of said second shaft; and second spring means adjacent the end of said movable shaft on which the bevel gear is fixed, for applying a second force to said movable shaft in a direction opposite said first force, said second force being weaker than said first force.

12. A mechanism for applying a pre-load to a bevel gear device, comprising:

first and second shafts, one of which is axially movable, wherein bevel gears are fixed to ends of said shafts in mesh with each other in which a turning force applied to one of said shafts is imparted to the other;

an angular bearing disposed about said movable shaft and spaced from the end of said movable shaft on which the bevel gear is fixed;

first spring means adjacent to said angular bearing for applying a first force to said movable shaft in an axial direction toward said bevel gear of said second shaft; and second spring means adjacent the end of said movable shaft on which the bevel gear is fixed for applying a second force to said movable shaft in a direction opposite said first force, said second force being weaker than said first force.

* * * * *